United States Patent
McGarian et al.

(10) Patent No.: US 6,431,273 B1
(45) Date of Patent: Aug. 13, 2002

(54) INFLATABLE PACKER

(75) Inventors: Bruce McGarian, Stonehaven; Ian Gillies, Brechin, both of (GB)

(73) Assignee: Smith International Inc., Houston, TX (US)

(*) Notice: Subject to any disclaimer, the term of this patent is extended or adjusted under 35 U.S.C. 154(b) by 0 days.

(21) Appl. No.: 09/600,624

(22) PCT Filed: Jan. 20, 1999

(86) PCT No.: PCT/GB99/00177

§ 371 (c)(1),
(2), (4) Date: Aug. 7, 2000

(87) PCT Pub. No.: WO99/36663

PCT Pub. Date: Jul. 22, 1999

(30) Foreign Application Priority Data

Jan. 20, 1998 (GB) .............................................. 9801201

(51) Int. Cl.[7] .......................... G21B 23/04; G21B 23/06
(52) U.S. Cl. ......................... 166/183; 166/184; 166/186
(58) Field of Search ................................ 166/386, 387, 166/129, 183–186

(56) References Cited

U.S. PATENT DOCUMENTS

| 4,424,860 A | * | 1/1984 | McGill |
| 5,184,677 A | | 2/1993 | Dobscha et al. |
| 5,549,165 A | | 8/1996 | Brooks |

FOREIGN PATENT DOCUMENTS

| GB | 656941 | 1/1949 |
| GB | 2 309 722 | 6/1977 |

OTHER PUBLICATIONS

Int. Publ. No. WO 97/30266—of Aug. 21, 1997—Marvin Holbert, Method and Apparatus for Use in Inflating Packer in Well Bore.

Int Publ. No. WO 97/28348—of Aug. 7, 1997—Robert Appleton, Inflatable Packer.

Int. Publ. No. WO 91/19882—of Dec. 26, 1991—Paul Gullet—Tools For Wells.

* cited by examiner

*Primary Examiner*—Roger Schoeppel
(74) *Attorney, Agent, or Firm*—Dykema Gossett PLLC (57) ABSTRACT

This invention relates to hydraulic anchor packers for use in well bores and, more particularly, to inflatable anchor packers. A hydraulic anchor packer (90) is provided having an inflatable packer element (36) incorporating a cylinder (38) and an elastomer sleeve (44) provided on the exterior surface thereof. The elastomer sleeve (44) but free of the cylinder (38) intermediate the end portions. Means are provided for causing fluid from within the cylinder (38) to flow through an aperture (48) and between the elastomer sleeve (44) and the exterior surface of the cylinder so as to radially expand the sleeve (44). Means are also provided for trapping fluid so as to prevent relaxation of the sleeve (44). Pressure relief means (92, 94, 98) permits fluid located exteriorly of the packer (90) to move past the sleeve (44) as the sleeve (44) expands whilst in engagement with a well bore wall during use. Thus, the downhole half of the sleeve (44) may freely expand and displace fluid located below the packer (90).

17 Claims, 6 Drawing Sheets

INFLATABLE PACKER

This invention relates to hydraulic anchor packers for use in well bores and, more particularly, to inflatable anchor packers.

It is well known in the gas and oil drilling industry that hydraulic anchor packers may be used to isolate sections of a well bore and support materials and equipment within a well bore. Conventional hydraulic anchor packers typically comprise a plurality of metallic gripping elements having a serrated surface for engaging the wall of a well bore. The gripping elements are generally mounted on, or operated by, hydraulic pistons which move the gripping elements between gripping and non-gripping positions in response to a hydraulic pressure differential. Although such anchor packers operate very effectively, they are expensive to manufacture and use. They are also unsuitable for use in uncased well bores.

An improved anchor packer is described in UK patent application number 9702148.9. The improved anchor packer incorporates an inflatable packer element which may be inflated with well bore fluid so as to expand an elastomer sleeve into gripping engagement with a well bore wall. This arrangement operates effectively in many situations, however where the downhole end of the packer is located in close proximity to the end of, or a blockage (e.g. a cement plug) in, the well bore, the packer is prone to failure. More specifically, there is a tendency for the elastomer sleeve to rupture due to an increase in static pressure within the well bore annulus. Generally speaking, it is the centre region of the elastomer sleeve located equidistant between the sleeve end portions which first abuts the well bore wall. Once this centre region of the sleeve is in abutment with a well bore, further inflation of the packer element radially expands those portions of the elastomer sleeve located both uphole and downhole of the centre region. However, where the downhole end of-the packer is adjacent, for example, a cement plug, displacement of annulus fluid from between the well bore wall and the downhole half of the elastomer sleeve is restricted. As a result, the uphole half of the elastomer sleeve tends to over inflate and become susceptible to rupturing. This problem is accentuated where expansion ratios of greater than 1:1 are required (e.g. where a 7½" OD packer is to be set in a 8½" ID well bore, or thereabouts) and a large volume of well bore fluid must be displaced.

In order to overcome this problem, it is known to provide the elastomer sleeve with a floating downhole end portion. During inflation, the cylinder of the packer element upon which the elastomer sleeve is mounted is sucked down relative to the well bore and the floating end portion, and thereby reduces the volume of fluid required to inflate the element and prevents an undesirable increase in static pressure below the packer. This may be detected at the surface by an apparent increase in conveying string weight which occurs because the elastomer sleeve, once abutting the well bore wall, cannot move uphole or downhole. However, a potential problem with the floating end portion system is that the required additional moving parts increase manufacturing costs, require maintenance and can themselves be prone to failure.

It is an object of the present invention to provide an inflatable anchor packer which is inexpensive to manufacture and reliable in use.

It is also an object of the present invention to provide an inflatable anchor packer which may be reliably used adjacent the end of, or a blockage in, a well bore.

The present invention provides a hydraulic anchor packer for use in a well bore comprising; an inflatable packer element incorporating a cylinder and an elastomer sleeve provided on the exterior surface thereof, the elastomer sleeve being retained by retaining means adjacent the cylinder at the end portions of the sleeve but free of the cylinder intermediate the end portions; an aperture defined by the wall of the cylinder for connecting the exterior of the cylinder in a region where the elastomer sleeve is free thereof to the interior of the cylinder; means for causing fluid from within the cylinder to flow through the aperture and between the elastomer sleeve and exterior surface of the cylinder to radially expand the elastomer sleeve; and means for trapping fluid located between the elastomer sleeve and the cylinder to prevent relaxation of the elastomer sleeve; wherein pressure relief means is provided for permitting fluid located exteriorly of the packer to move past the elastomer sleeve as the sleeve expands whilst in engagement with a well bore wall during use.

Thus, as the elastomer sleeve of the present invention radially expands whilst abutting a well bore wall, an increase in fluid pressure below the packer is relieved by the pressure relief means which allows fluid below the packer to be displaced uphole to a location above the packer. The elastomer sleeve is thereby able to inflate freely without the need for one or more floating end portions.

Further features of the present invention are set out in subsidiary claims 2 to 19.

Embodiments of the present invention will now be described with reference to the accompanying drawings, in which.

Figure 1:
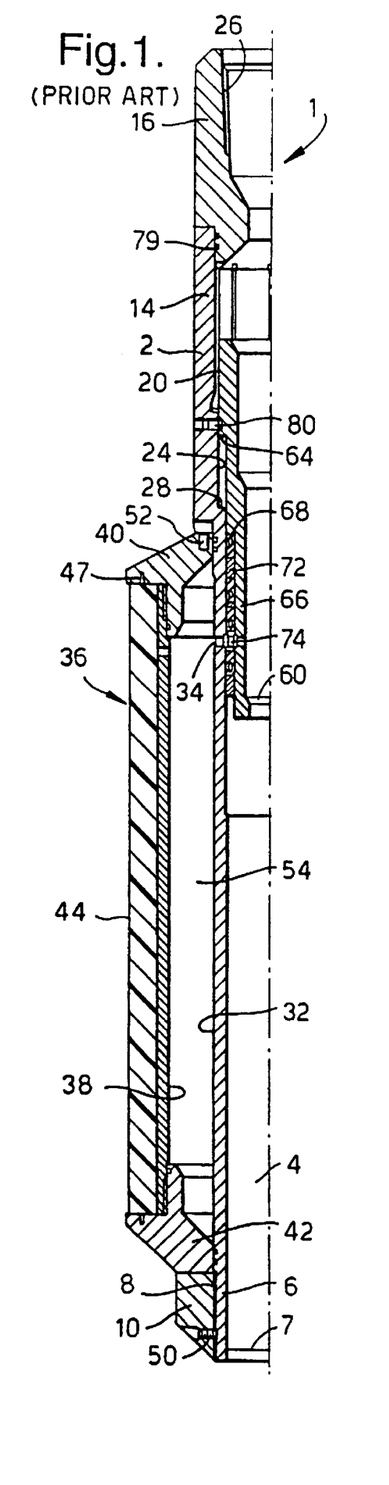
FIG. 1 is a partial cross-sectional view of a prior art hydraulic anchor packer configured in an unset position.
Figure 2:
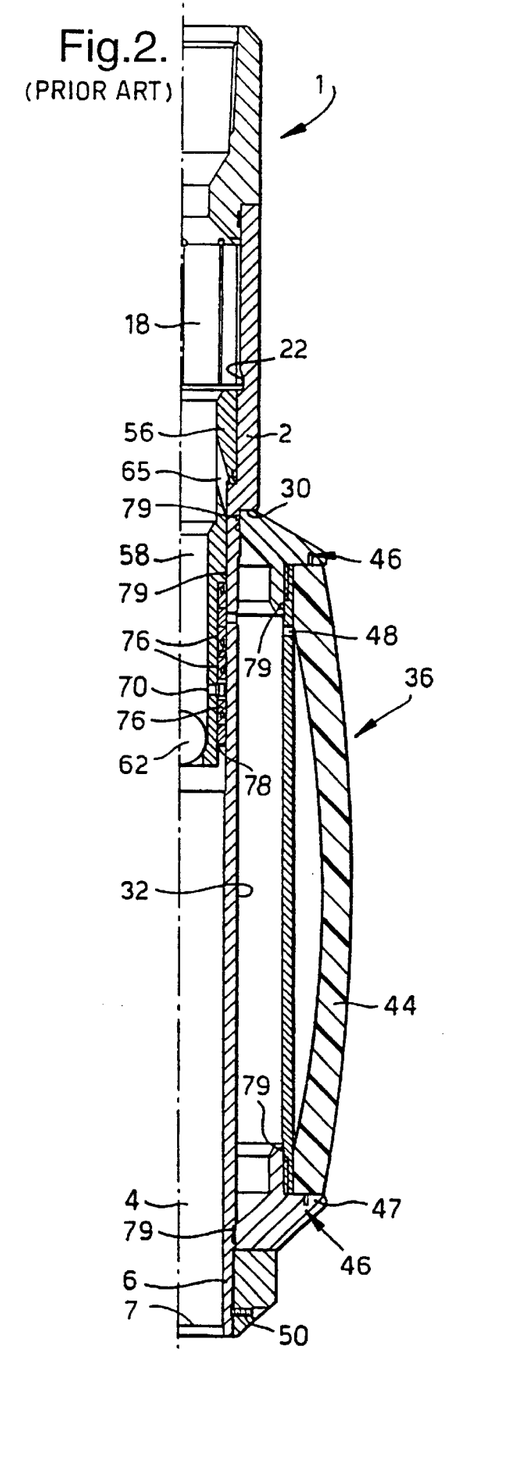
FIG. 2 is a partial cross-sectional view of the hydraulic anchor packer of FIG. 1 configured in a set position.

A prior art packer similar to that described in UK patent application number 9702148.9 is shown in FIGS. 1 and 2. This prior art packer 1 incorporates a plurality of components mounted on a substantially cylindrical mandrel 2. The mandrel 2 defines a bore 4 through which well bore fluid may pass when the apparatus is in use. The lower end 6 of the mandrel 2 is provided with a filter screen 7 for the filtering of well bore fluid entering the lower end 6 from the annulus. Further filter screens may be provided either within the anchor packer or within the conveying string to filter well bore fluid flowing down the string.

An external screw thread 8 is also provided on the lower end 6 for receiving a retaining nut 10. The upper end 14 of the mandrel 2 is adapted to receive a top sub 16. The top sub 16 is provided with a cohlett 18 having a plurality of fingers 20. The ends of the fingers 20 are formed so as to locate within a recess 22 defined by the interior surface 24 of the mandrel 2. The top sub 16 may be thereby attached to the upper end 14 of the mandrel 2. An internal screw thread 26 is provided on the top sub 16 for the reception of a conveying string (not shown).

An internal shoulder 28 is formed on the interior surface 24 of the mandrel, and an external shoulder 30 is formed on the exterior surface 32 of the mandrel. Inflate ports 34 are provided in the wall of the mandrel 2 below the external shoulder 30.

An inflatable packer element 36 is arranged on the exterior surface 32 of the mandrel 2 and extends from the external shoulder 30 to the lower end 6. The inflatable packer element 36 is a discrete assembly of components which may be readily removed from the mandrel 2 for the purposes of maintenance or replacement. The components of the inflatable packer element 36 include a cylinder 38, an upper and lower nut 40,42, an elastomer sleeve 44 and a plurality of reinforcing elements 46. The upper and lower nuts 40,42 are threadedly engaged with the upper and lower ends of the cylinder 38 respectively so as to provide retaining shoulders against which end portions of the elastomer sleeve 44 abut. The elastomer sleeve 44 extends about the cylinder 38 between the upper and lower nuts 40,42.

The elastomer sleeve is manufactured from a rubber material, but may be produced from any other material having suitable elastic properties. The end portions of the elastomer sleeve 44 are retained adjacent the cylinder 38 and the upper and lower nuts 40,42 by means of a suitable adhesive or other fixing agent. The attachment is reinforced by the reinforcing elements 46 which consist of twenty four spring bars 47. The spring bars 47 project from each nut 40,42 so as to penetrate the end portions of the elastomer sleeve 44. Apertures 48 are provided in the cylinder 38 between the parts of the cylinder 38 attached to the end portions of the elastomer sleeve 44.

The inflatable packer element 36 is assembled by firstly screwing the nuts 40,42 onto the respective ends of the cylinder 38. The areas of the cylinder 38, the nuts 40,42 and the reinforcing elements 46 to be attached to the elastomer sleeve 44 are then shot blasted and applied with a fixing agent. The elastomer sleeve 44 is then finally applied by means of conventional compression moulding techniques. Injection moulding techniques may be used as an alternative to compression moulding.

The inflatable packer element 36 is slidably located on the mandrel 2 so that the upper nut 40 abuts the external shoulder-30. Axial movement of the inflatable packer element 36 in the direction of the lower end 6 of the mandrel 2 is prevented by means of the retaining nut 10 which is threadedly engaged with the lower end 6 so as to abut the lower nut 42. The retaining nut 10 is secured in position by means of lock screws 50. Rotational movement of the inflatable packer element 36 relative to the mandrel 2 is prevented by means of an alignment dowel 52. The upper and lower nuts 40,42 are shaped so as to provide an annular space 54 between the cylinder 38 and the mandrel 2, thereby ensuring unrestricted fluid communication between the apertures 48 and the inflate ports 34.

A piston 56 is slidably located within the bore 4 of the mandrel 2. The piston 56 is substantially cylindrical in shape and defines a bore 58 through which well bore fluid may pass when the hydraulic anchor packer is in use. The lower end of the piston bore 58 is provided with a seat 60 for receiving a drop ball 62. The upper end of the piston 56 is provided with an external piston shoulder 64 which, when in use, abuts the internal shoulder 28 so as to limit the axial movement of the piston 56 towards the lower end 6 of the mandrel 2. A pressure relief port 65 is formed in the upper end of the piston 56. When the piston 56 moves axially towards the lower end 6, well bore fluid located between the external piston shoulder 64 and the internal shoulder 28 flows through the pressure relief port 65. The movement of the piston 56 is thereby assisted.

A lower wall 66 of the piston 56 is spaced from the interior surface 24 of the mandrel 2 below a step 68. Flow ports 70 are provided in the lower wall 66. The space between the lower wall 66 and the interior surface 24 is occupied by an isolating ring 72 and a flow port ring 74. The isolating ring 72 is provided as a solid ring of material, whereas the flow port ring 74 is provided as a ring of material incorporating a plurality of holes. Undesirable leakage of well bore fluid between the mandrel 2 and the lower wall 66 is prevented by means of lip seals 76. The isolating ring 72, the flow port ring 74 and the lip seals 76 are retained in position by means of a circlip 78. Additional seals 79 are provided throughout the packer 1 to prevent further leakage of well bore fluid.

FIG. 1 shows the packer 1 arranged in an unset position. In this configuration, the piston 56 is located in abutment with the fingers 20 of the collett 18. The upper portion of the piston 56 engages the collett. 18 so as to press the ends of the fingers 20 into the recess 22. Movement of the piston 56 is prevented by means of a shear pin 80. The top sub 16 is thereby securely attached to the mandrel 2. When the piston 56 is located as shown in FIG. 1, the piston bore 58 is in fluid communication with the apertures 48 through the flow ports 70 and the holes in the flow port ring 74.

When in use, the hydraulic anchor packer is attached to a conveying string and located within a well bore. Once the anchor packer has. been correctly positioned, the apparatus may be set by pumping well bore fluid down the conveying string and through the bores 4,58 of the apparatus, and by then introducing a drop ball 62 into the fluid flow. The drop ball 62 may be introduced into the fluid flow either at the surface or at some point along the length of the conveying string. When the drop ball 62 is released from a location along the conveying string, suitable means (not shown) for holding and releasing the drop ball must be provided.

When the drop ball 62 is received by the seat 60, the flow of well bore fluid through the piston bore 58 is diverted through the flow ports 70, the flow port ring 74, the inflate ports 34 and the apertures 48. The well bore fluid is thereby directed between the cylinder 38 and the elastomer sleeve 44. The elastomer sleeve 44 is expanded and displaced radially by the well bore fluid so as to abut the wall of the well bore. However, the end portions of the elastomer sleeve 44 remain adjacent to the cylinder 38 and the upper and lower nuts 40,42, thereby preventing an undesirable leakage of well bore fluid. Once the pressure of the fluid located between the cylinder 38 and the elastomer sleeve 44 has increased to a predetermined level, the shear pin 80 shears and the piston 56 moves axially within the mandrel 2 to the set position shown in FIG. 2. This shearing occurs in response to a hydraulic pressure differential across the piston 56. In the set position, the isolating ring 72 isolates the fluid located between the cylinder 38 and the elastomer sleeve 44 from the well bore fluid located within the piston bore 58. Whilst the apparatus is configured in the set position. the piston 56 is spaced from the collett 18 thereby leaving the fingers 20 free to slide from the recess 22. Removal from the well bore of the top sub 16 and conveying string is then possible without loss of fluid from between the cylinder 38 and the elastomer sleeve 44. The arrangement of the piston 56 is such that the isolating ring 72 locates so as to seal the inflate ports 34 before the piston 56 becomes spaced from the collett 18 to release the top sub 16.

There are a number of known modifications that can be made to the prior art packer 1. For example, metallic serrated grips may be provided on the external surface of elastomer sleeve 44 to assist the elastomer sleeve 44 in the gripping of a well bore casing. Also, the manner in which the end portions of the elastomer sleeve 44 are retained may differ from that described above. For instance, the reinforcing elements 46 may be omitted. Alternatively, the end portions of the elastomer sleeve may be attached to-just the retaining shoulders rather than to both the retaining shoulders and the adjacent surface of the cylinder 38. Yet a further known modification involves the provision of means for inflating the elastomer sleeve 44 with water or brine rather than with well bore fluid. In this way, the risk of blocking the cylinder apertures 48, the inflate ports 34 and the holes of the flow port ring 74. (without the need for fluid filtration devices) is substantially reduced. This in turn also reduces the risk of the piston 56 becoming jammed.

In circumstances where a large radial displacement of the elastomer sleeve 44 is required, a known modification of significant importance is the provision of a floating end portion of the elastomer sleeve 44. The arrangement is such that a suitable seal is maintained between the floating end portion and the cylinder 38 whilst permitting relative axial movement. Typically, it is the downhole end of the inflatable packer element 36 which is provided with a floating capability. In this way, if the downhole end of the packer 1 is located adjacent a cement plug during the packer setting operation, then an undesirable increase in static hydraulic pressure below the region where the elastomer sleeve 44 engages the well bore wall is avoided. For an inflatable packer element 36 having fixed ends, such an increase in pressure can restrict the expansion of the downhole portion of the elastomer sleeve 44 and, as a result, cause the uphole portion to over expand and rupture.

Figure 3:
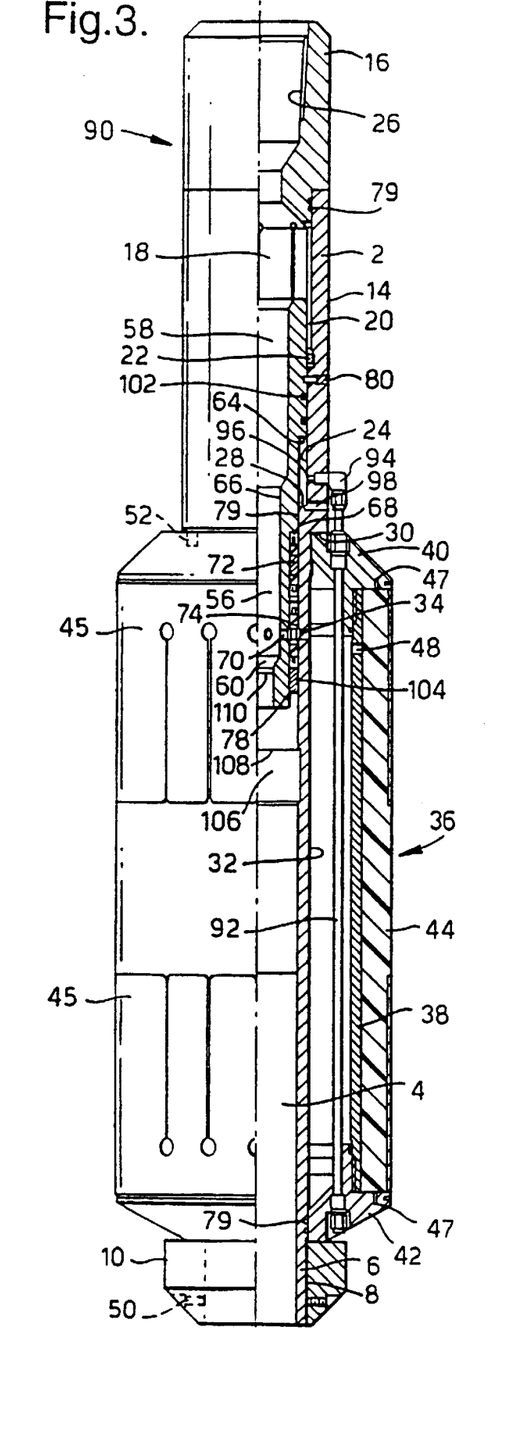
FIG. 3 is a partial cross-sectional view of a first embodiment of the present invention configured in an unset position.

A hydraulic anchor packer 90 according to the present invention is shown in an unset position in FIG. 3. The packer 90 has many similarities with the prior art packer 1 shown in FIGS. 1 and 2, and corresponding components of the two packers 1,90 are labelled in the drawings with like reference numerals. The anchor packer 90 does however have a number of new features which are of significant benefit.

Firstly, the anchor packer 90 incorporates an annulus pressure relief system wherein the inflatable packer element 36 is provided with a hydraulic tube 92 extending in. a longitudinal direction between the upper and lower nuts 40,42. In the assembled packer 90, the hydraulic tube 92 is positioned in the annular space defined between the mandrel 2 and the cylinder 38. The downhole end of the hydraulic tube 92 is attached to the lower nut 42 and passes therethrough to open onto the exterior of the element 36. The uphole end of the hydraulic tube 92 passes through and is attached to the upper nut 40. One end of a 90° hydraulic tube connector 94 is attached to the uphole end of the hydraulic tube 92 whilst the other end of the connector 94 is engaged with a hole 96 in-the mandrel 2. With the packer 90 arranged in the unset position as shown in FIG. 3, the hole 96 opens into the annular space defined between the external piston shoulder 64 and the internal mandrel shoulder 28. Thus, when in use, said annular space is in fluid communication with the region of well bore annulus located downhole of the elastomer-sleeve 44. Said annular space is also in fluid communication with the region of well bore annulus located uphole of the elastomer sleeve 44 by means of a relief port 98 in the mandrel 2.

One purpose of the relief port 98 is to prevent hydraulic lock and thereby assist in the axial movement of the piston 56. In this regard, the relief port 98 in the mandrel 2 performs the same function as the relief port 65 provided in the piston 56 of the prior art packer 1. Accordingly, a relief port 65 is not required in the piston 56 of the packer 90 shown in FIG. 3.

The relief port 98 also has the secondary function of cooperating with the hydraulic tube 92 and connector 94 so as to provide an annulus pressure relief system which ensures communication, prior to the setting of the packer 90, between annulus well bore fluid located downhole of the elastomer sleeve 44 and annulus well bore fluid located uphole of the elastomer sleeve 44.

In circumstances where a cement plug is in close proximity to the downhole end of the packer 90 and especially in circumstances where the inflatable packer element 36 is also required to have an expansion ratio of greater than 1:1, the annulus pressure relief system allows for effective operation without the need for an element 36 having a floating end portion.

In use, the packer 90 is operated in a similar manner to that described above in respect of the prior art packer 1. The packer 90 is run down a well bore on a conveying string in the unset position shown in FIG. 3. Once at the required location, the packer element 36 is inflated by diverting a flow of well bore fluid through the flow ports 70, the flow port ring 74, the inflate ports 34 and the apertures 48. Rather than using a drop ball, the diversion of well bore fluid is effected by the introduction of an actuating dart 100 (see FIG. 4) which is received by the piston seat 60. As the packer element 36 inflates and the elastomer sleeve 44 engages the wall of the well bore, fluid located in the annulus downhole of the point of engagement remains in communication with annulus fluid located uphole of said point of engagement by virtue of the hydraulic tube 92 and the associated features described above (i.e. the annulus pressure relief system). Thus, annulus fluid is free to flow past the elastomer sleeve 44 as the packer element 36 continues to inflate. Consequently, the well bore fluid in the annulus both above and below the inflatable packer element 36 (and of course the well bore fluid located in the mandrel bore 4 and below the seated actuating dart) is at the normal ambient static pressure for the depth at which the packer 90 is positioned. The well bore fluid within the annular space defined by the external piston shoulder 64 and the internal mandrel shoulder 28 is also at this ambient static pressure. The static pressure associated with the aforementioned fluid will remain at the ambient level regardless of the degree of packer element 36 inflation. Thus, the static pressure of the fluid located above the actuating dart 100 in the piston bore 58 may be increased (thereby overcoming the elastic resilience of the elastomer sleeve 44 and increasing the inflation of the packer element 36) to the desired level without risk of the elastomer sleeve 44 rupturing.

Figure 5:
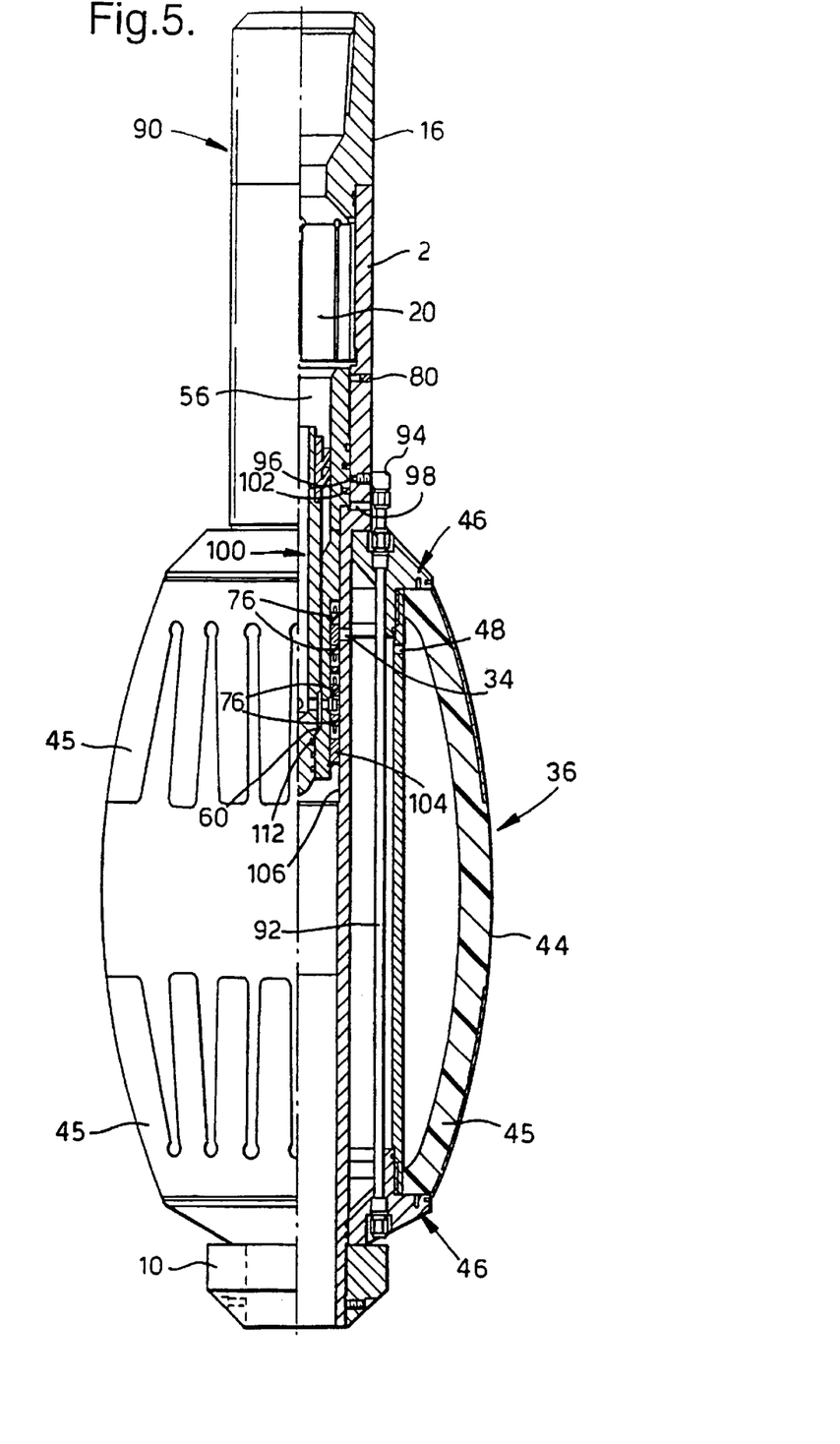
FIG. 5 is a partial cross-sectional view of the first embodiment configured in a set position.

Once the desired pressure level has been achieved, the pin 80 shears and the pressure differential across the piston 56 moves the packer 90 into the set position shown in FIG. 5. As previously described in respect of the prior art packer 1, once the packer 90 is in the set position it is not possible for fluid within the packer element 36 to escape. Furthermore, in moving downhole, the piston 56 seals the hole 96 in the mandrel 2 by means of a ring seal 102.

As an alternative to the above described annulus pressure relief system, effective operation of the prior art anchor packer 1 may be ensured without the need for a floating end portion by means of a floating ball/dart seat provided in the piston bore 58. A packer incorporating a floating seat is not shown in the accompanying drawings, however the arrangement comprises a discrete seat component which is sealed to the piston bore 58 and axially movable relative thereto. In use, the floating seat is initially located at the downhole end of the piston bore 58. As the elastomer sleeve 44 engages the well bore wall and continues to expand, thereby displacing annulus well bore fluid below the element 36, the floating seat moves uphole within the piston bore 58. In this way, the downhole portion of the elastomer sleeve 44 is able to expand in the required manner so as to abut the well bore wall. The downhole end of the piston 56 is sufficiently spaced from the flow ports 70 to allow both a full inflation of the element 36 and a consequential uphole movement of the floating seat without the flow ports 70 and floating seat interfering with one another. A negative aspect of the floating seat arrangement is that the axial movement of the seat necessary to accommodate the fluid displacement (as much as approximately 50% of the fluid volume necessary to inflate die packer element 36) results in a piston 56 which is inordinately long for the prior art packer 1 design.

In addition to the annulus pressure relief system, the hydraulic anchor packer 90 shown in FIGS. 3 and 5 has a number of further new and beneficial features as compared to the prior art packer 1. The piston 56 is provided with a locking circlip 104 for engagement with a groove 106 in the mandrel bore 4. The locking circlip 104 is received by the groove 106 once the piston 56 has moved axially downhole so as to configure the packer 90 in the set position. Abutment of the locking circlip 104 against a step 108 of the groove 106 prevents a subsequent uphole movement of the piston 56 sufficient to open the inflate ports 34 and reconfigure the packer 90 in the unset position.

A groove 110 is also defined in the downhole end of the piston bore 58 for receiving a locking circlip 112 (see FIG. 4) provided on the downhole end of the actuating dart 100. The arrangement is such that, when the actuating dart 100 is received by the seat 60, the locking circlip 112 engages the piston groove 110 and thereby locks the actuating dart 100 and piston 56 together.

Figure 4:
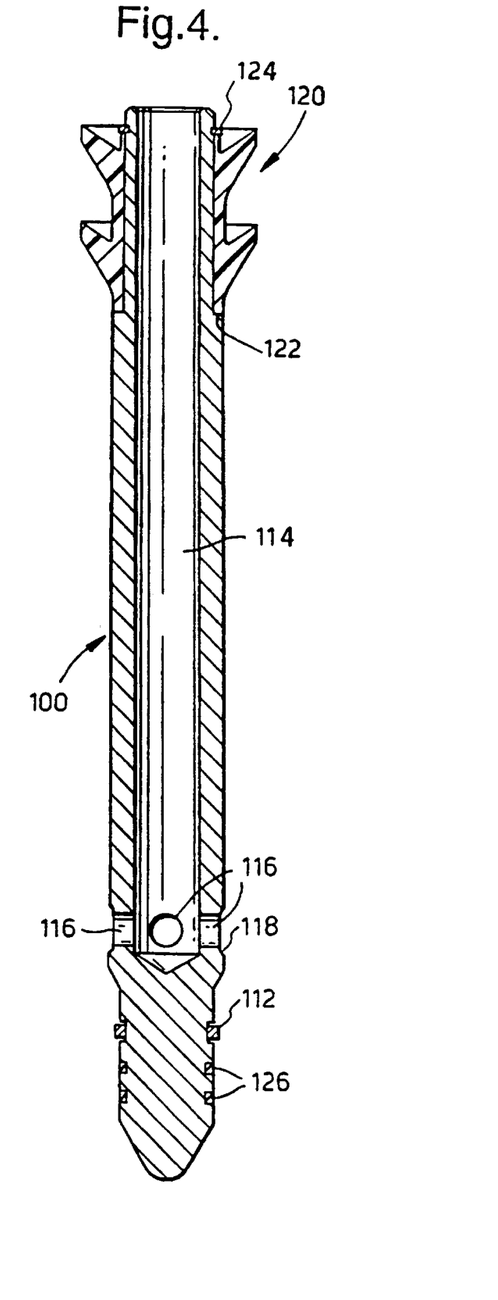
FIG. 4 is a cross-sectional view of an actuating dart.

A detailed view of the actuating dart 100 is shown in FIG. 4. The dart 100 is generally cylindrical in shape defining a longitudinal bore 114. The downhole end of the bore 1 14 terminates with laterally extending apertures 116 which are axially positioned so as to locate adjacent the flow ports 70 when the dart 100 is received on the seat 60. Fluid communication between the dart bore 114 and the flow port 70 via the apertures 116 is ensured by means of a recess 118 in the exterior surface of the dart 100 in the region of the apertures 116. A plurality of cup members 120 radially extend from the uphole end of the actuating dart 100. The cup members have a unitary structure and are held in position against a shoulder 122 by means of a circlip 124. The downhole end of the dart 100 is provided with ring seals 126 which, when the dart 100 is received on the seat 60. prevent leakage of fluid between the dart 100 and the piston 56.

As an alternative to the piston and actuating dart locking mechanisms (104,106,110,112), undesirable uphole movement of the piston 56 may be prevented by means of a flapper check valve. This alternative arrangement is not shown in the accompanying drawings. The flapper check valve is located below the piston 56 in the mandrel bore 4 and permits a flow of fluid therepast in only a downhole direction. Consequently, any uphole migration of fluid (gas or liquid) through the mandrel bore 4 is restricted to such a level that lifting of the piston and actuating dart (or drop ball) is prevented.

Furthermore, in circumstances where a large expansion ratio (say up to 2:1) is required, the elastomer sleeve 44 may be provided with supporting shrouds 45. Such shrouds are included in the packer 90 of FIGS. 3 and 5. Each shroud 45 is made from a metallic material and is provided as a band located on the exterior surface of an end of the elastomer sleeve 44. Each shroud 45 also has a plurality of finger elements extending from the band in a longitudinal direction towards the centre region of the elastomer sleeve 44.

A yet further feature of benefit is a scraper (not shown) which is attached by suitable means to the downhole end of the packer 90. The scraper functions to clean the wall of the well bore and thereby ensure the hydraulic integrity of the elastomer element 44 and well bore interface. This arrangement is only suitable for expansion ratios of 1:1 because the scraper, unless mounted on a radially extendable element, is unable to reach the well bore wall. The scraper is. preferably capable of sweeping the entire well bore circumference without the need for it to be rotated about the well bore axis.

Figure 6:
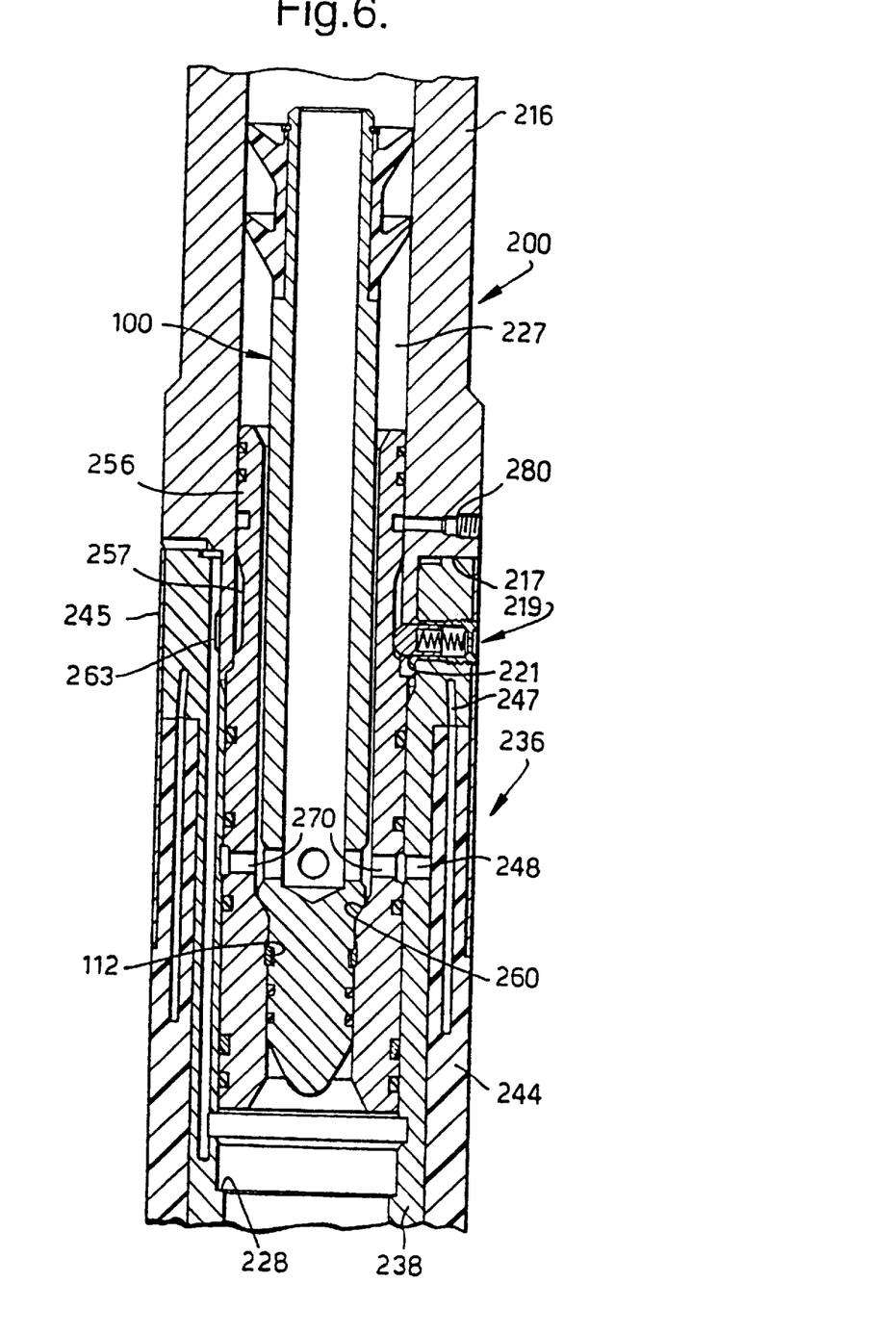
FIG. 6 is a cross-sectional view of a second embodiment of the present invention configured in an unset position.
Figure 7:
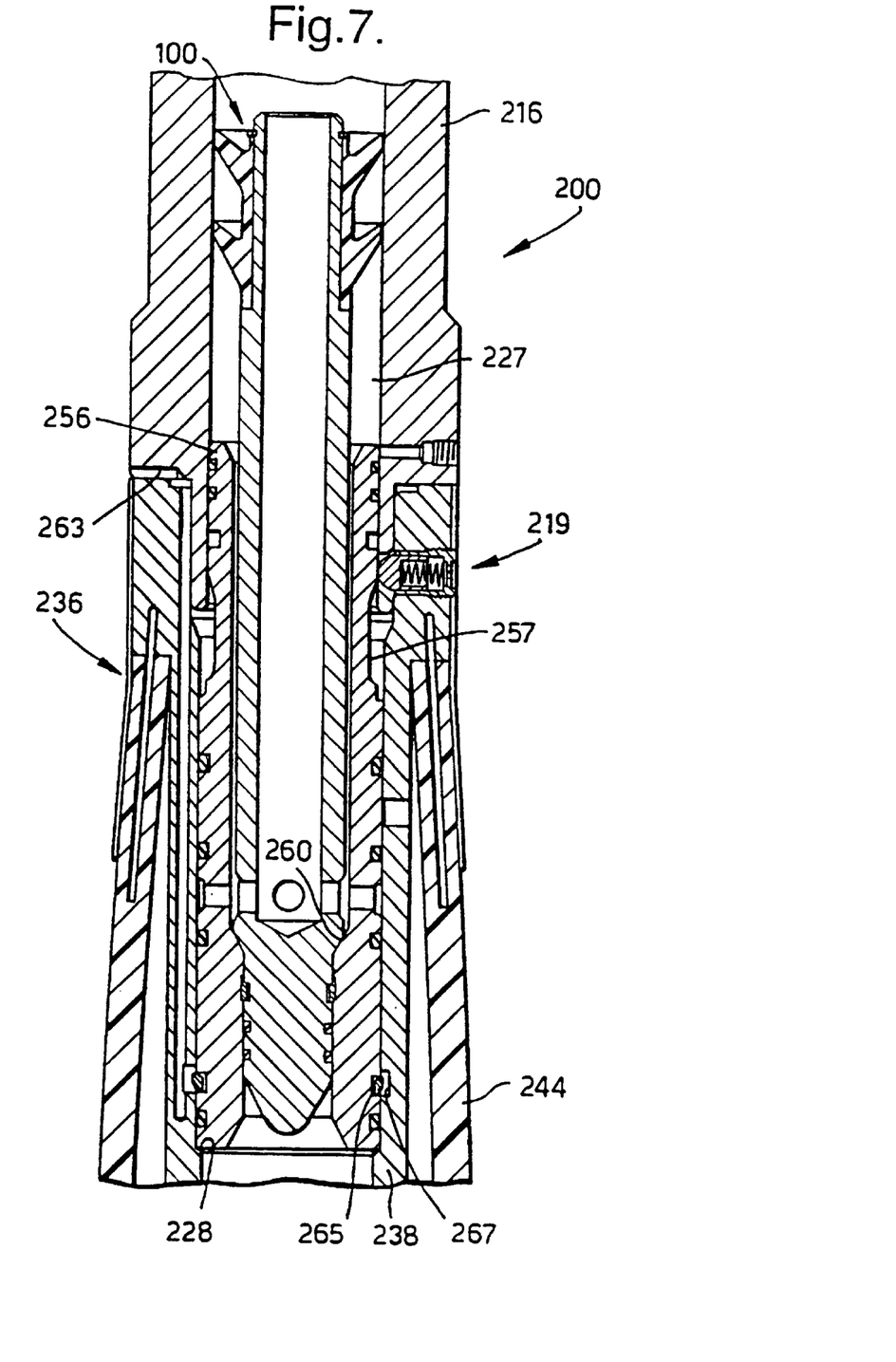
FIG. 7 is a cross-sectional view of the embodiment of FIG. 6 configured in a set position.

The present invention is not limited to the specific embodiments described above. Alternative arrangements and materials will be apparent to a reader skilled in the art, For example. a further embodiment (hydraulic anchor packer 200) is shown in FIGS. 6, 7. 8 and 9.

The further embodiment incorporates an inflatable packer element 236 which is mounted directly on a top sub 216 of a conveying string (not shown). in contrast, the aforementioned anchor packers 1,90 comprise an inflatable packer element which is attached to a top sub via a mandrel. The inflatable packer element 236 has components equivalent to the upper and lower nuts 40,42 of the aforementioned packers 1,90. These equivalent components are however formed integrally with a cylinder 238 upon which an elastomer sleeve 244 is mounted. Shrouds 245 and spring bars 247 are provided so as to support the ends of the elastomer sleeve 244. An aperture 248 is also provided in the cylinder 238 so that fluid may be pumped between the cylinder 238 and the elastomer sleeve 244.

Figure 8:
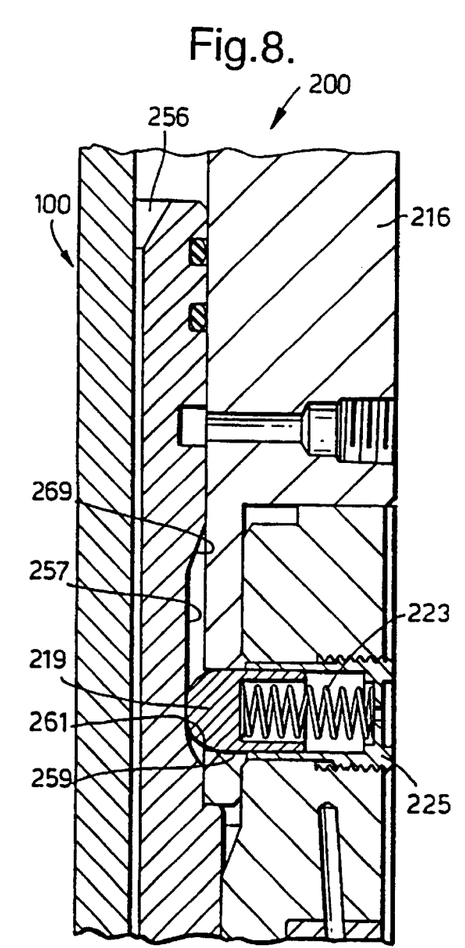
FIG. 8 is a large scale cross-sectional view of conveying string release means as shown in FIG. 6.
Figure 9:
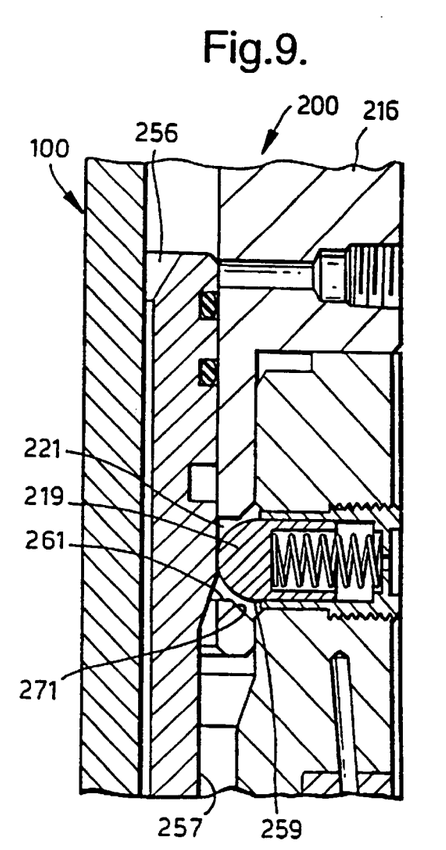
FIG. 9 is a large scale cross-sectional view of conveying string release means as shown in FIG. 7.

The uphole end of the inflatable packer element 236 is located about the downhole end of the top sub 216. The uphole end of the packer element 236 is arranged in abutment with an external shoulder 217 of the top sub 216. The packer element 236 and top sub 216 are secured together by means of a spring biased pin 219 which is mounted in the uphole end of the packer element 236 and extends through an aperture 221 in the downhole end of the top sub 216. A large scale view of the pin 219 is shown in FIGS. 8 and 9. The pin 219 is biased by means of a spring 223 which is attached to both the pin 219 and a base member 225 threadedly engaged with the packer element 236.

The inflatable packer element 236 and top sub 216 locate adjacent one another so as to define a bore 227 in which a cylindrical piston 256 is located for axial movement. A plurality of flow ports 270 are defined in the wall of the piston 256. The external surface of the piston 256 is recessed in the region of the flow ports 270 so that, when said recess is adjacent the aperture 248 of the packer element 236, fluid may flow through each of the flow ports 270 and into the aperture 248. Undesirable leakage of fluid between the piston 256 and the cylinder 238 is prevented by means of appropriate seals.

The piston 256 is initially held, by means of a shear pin 280 mounted in the top sub 216, so that the flow ports 270 are in fluid communication with the aperture 248 (as shown in FIGS. 6 and 8). In this position. the pin 219 is biased through the aperture 221 in the top sub 216 so as to be received within a circumferential recess 257 in the exterior surface of the piston 256. The pin 219 is thereby sufficiently extended for the downhole facing side 259 of the pin 219 to abut the uphole facing side 261 of the aperture 221. In this way, separation of the top sub 216 from the inflatable packer element 236 whilst the piston 256 is in its initial position is prevented.

When in use, the hydraulic anchor packer 200 is run downhole with the piston 256 located in the initial position shown in FIGS. 6 and 8. Once at the required depth, an actuating dart 100 (as shown in FIG. 4) is pumped through the bore of the packer 200 and is received within the piston 256. The actuating dart 100 is pumped downhole until it engages a seat 260 provided within the piston 256. A locking circlip 112 mounted on the downhole end of the actuating dart 100 then engages a groove in the piston 256 so as to effectively lock the actuating dart 100 and piston 56 together. With the actuating dart 100 received on the seat 260, apertures 116 in the dart 100 are positioned adjacent the flow ports 270. Continued pumping of well bore fluid results in a flow of fluid through the dart apertures 116, the flow ports 270, the cylinder aperture 248 and into the region between the cylinder 238 and the elastomer sleeve 244. The elastomer sleeve 244 is thereby radially expanded so as to engage the wall of the well bore.

As the elastomer sleeve 244 expands whilst in abutment with the well bore wall, any increase in annulus fluid pressure below the elastomer sleeve 244 is relieved by means of a fluid pathway 263 which is, at least in part, defined within the wall of the cylinder 238. The fluid pathway 263 provides fluid communication between the region of annulus located above the elastomer sleeve 244 and the packer bore located below the piston 256 (which is itself in fluid communication with the region of annulus located below the elastomer sleeve 244). Thus, since the well bore fluid located below the piston 256 and the actuating dart 100 is at ambient well bore static pressure, the higher static pressure in the packer bore above the piston 256 and the actuating dart 100 (required to firmly engage the elastomer sleeve 244 with the well bore wall) produces a resultant downhole force on the piston 256. The shear pin 280 is selected so that it shears under the force exerted on the piston 256 when the inflatable packer element 236 is inflated to the required level. Once the shear pin 280 has sheared, the piston 256 and the actuating dart 100 are pushed downhole within the packer bore 227 until the downhole end of the piston 256 abuts a shoulder 228 on the cylinder. A locking circlip 265 mounted on the piston 256 then locates in a circumferential groove 267 defined in the cylinder. Subsequent uphole movement of the piston 256 relative to the cylinder 238 is thereby prevented. The downhole movement of the piston 256 from its initial position results in the aperture 248 in the cylinder 238 becoming blocked. Circumferential seals mounted on the piston 256 ensure that undesirable leakage of fluid from between the cylinder 238 and the elastomer sleeve 244 is prevented. The fluid pathway 263 is also sealingly blocked at its downhole end by means of the piston 256 and circumferential seals.

As the piston 256 moves downhole towards the cylinder shoulder 228, the pin 219 is pressed radially outwardly against the bias of the spring 223 by a ramp surface 269. When the piston 256 is in contact with the cylinder shoulder 228, the pin 219 has been sufficiently moved so that the downhole facing side 259 of the pin 219 and the uphole facing side 261 of the aperture 221 are no longer able to abut each other. Rather, the end of the pin 219 lies adjacent a chamfered edge 271 of the top sub 216. The end of the pin 219 is rounded and uphole movement of the top sub 216 results in its abutment with the chamfered edge 271. Continued uphole movement of the top sub 216 causes the end of the pin 219 to cam over the chamfered edge 271. Thus, once the packer 200 is configured in the set position, the top sub 216 and associated conveying string are no longer secured to the packer element 236 and may be pulled uphole leaving the packer element 236 set at the required depth.

Further alternative embodiments will be apparent to a reader skilled in the art.

What is claimed is:

1. A hydraulic anchor packer for use in a well bore comprising:

an inflatable packer element incorporating a cylinder and an elastomer sleeve provided on the exterior surface thereof, the elastomer sleeve being retained by retaining means adjacent the cylinder at the end portions of the sleeve but free of the cylinder intermediate the end portions;

an aperture defined by the wall of the cylinder for connecting the exterior of the cylinder in a region where the elastomer sleeve is free thereof to the interior of the cylinder;

means for causing fluid from within the cylinder to flow through the aperture and between the elastomer sleeve and exterior surface of the cylinder to radially expand the elastomer sleeve;

means for trapping fluid located between the elastomer sleeve and the cylinder to prevent relaxation of the elastomer sleeve;

said fluid trapping means comprising a piston moveable by an application thereto of fluid pressure; and pressure relief means for permitting fluid located exteriorly of the packer to move past the elastomer sleeve as the sleeve expands whilst in engagement with a well bore wall during use;

wherein means integral with said fluid trapping means is provided for rendering the pressure relief means inoperative when said fluid trapping means is activated so as to trap fluid located between the elastomer sleeve and the cylinder.

2. The hydraulic anchor packer as claimed in claim 1, wherein:

the pressure relief means comprises a fluid pathway in the interior of the cylinder having ends opening onto the exterior surface of the packer.

3. The hydraulic anchor packer as claimed in claim 2, wherein:

the elastomer sleeve is located between the ends of said fluid pathway.

4. The hydraulic anchor packer as claimed in claim 2, wherein:

at least part of said fluid pathway is a hydraulic tube.

5. The hydraulic anchor packer as claimed in claim 1, wherein:

the pressure relief means comprises a fluid pathway of which at least a portion is located within the wall of the cylinder.

6. The hydraulic anchor packer as claimed in claim 5, wherein:

at least a portion of said fluid pathway extends between an opening onto the exterior surface of the packer and an opening onto the interior surface of the cylinder.

7. The hydraulic anchor packer as claimed in claim 1, wherein:

the means for rendering the pressure relief means inoperative comprises a valve for selectively preventing fluid flow.

8. The hydraulic anchor packer as claimed in claim 1, wherein:

the fluid trapping means comprises a wall which is slidably moveable adjacent the interior surface of the cylinder between a non-trapping position, in which the location of said wall relative to the flow port permits a flow of fluid through the flow port, and a trapping position, in which said wall sealingly blocks the flow port so as to prevent a flow of fluid therethrough.

9. The hydraulic anchor packer as claimed in claim 8, wherein:

the wall of the fluid trapping means locates in the trapping position so as to render the pressure relief means inoperative by sealingly blocking a fluid pathway of the pressure relief means.

10. The hydraulic anchor packer as claimed in claim 8, wherein:

a shear pin is provided to releasably hold the wall of the fluid trapping means in the non-trapping position.

11. The hydraulic anchor packer as claimed in claim 1, wherein:

activation of the fluid trapping means so as to trap fluid between the elastomer sleeve and the cylinder operates a mechanism for releasing the hydraulic anchor packer from a well bore string, said mechanism comprising a pin mounted on one of the packer or string and biased so as to retractably extend to engage the other of the packer or string, said activation of the fluid trapping means at least partially retracting the pin.

12. The hydraulic anchor packer as claimed in claim 1, wherein:

the means for causing fluid to flow through the aperture comprises an actuating dart and a seat located within the cylinder for receiving the dart.

13. The hydraulic anchor packer as claimed in claim 12, wherein:

means are provided for retaining an actuating dart adjacent the seat during use.

14. The hydraulic anchor packer as claimed in claim 13, wherein:

the retaining means comprises a circlip or a groove for receiving a circlip.

15. The hydraulic anchor packer as claimed in claim 1, wherein:

means are provided for preventing the fluid trapping means from being deactivated once activated so as to trap fluid located between the elastomer sleeve and the cylinder.

16. The hydraulic anchor packer as claimed in claim 15, wherein:

said means for preventing deactivations of the fluid trapping means comprises a circlip or a groove for receiving a circlip.

17. The hydraulic anchor packer as claimed in claim 15, wherein:

said means for preventing deactivation of the fluid trapping means comprises a check valve located in the interior of the cylinder.

* * * * *